(12) United States Patent
McCune

(10) Patent No.: US 7,883,438 B2
(45) Date of Patent: *Feb. 8, 2011

(54) LUBRICATION OF WINDMILLING JOURNAL BEARINGS

(75) Inventor: Michael E. McCune, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/631,162

(22) Filed: Dec. 4, 2009

(65) Prior Publication Data

US 2010/0086403 A1 Apr. 8, 2010

Related U.S. Application Data

(63) Continuation of application No. 11/582,581, filed on Oct. 18, 2006, now Pat. No. 7,662,059.

(51) Int. Cl.
*F16H 57/04* (2010.01)
*F16H 57/08* (2006.01)
*F16N 1/00* (2006.01)
*F01D 25/18* (2006.01)

(52) U.S. Cl. .................. 475/159; 475/161; 475/331; 184/4; 184/6.11; 184/6.12; 184/27.2

(58) Field of Classification Search ............... 475/159, 475/161, 331, 160; 184/4, 6.11, 6.12, 27.2
See application file for complete search history.

(56) References Cited

U.S. PATENT DOCUMENTS

| | | | |
|---|---|---|---|
| 4,892,011 A | 1/1990 | Nishida et al. | |
| 5,102,379 A | 4/1992 | Pagluica et al. | |
| 5,433,674 A | 7/1995 | Sheridan et al. | |
| 5,928,100 A * | 7/1999 | Ohtake et al. | 475/159 |
| 6,223,616 B1 | 5/2001 | Sheridan | |
| 7,377,870 B2 | 5/2008 | Matsushita et al. | |
| 2006/0223664 A1 | 10/2006 | Duong et al. | |

(Continued)

FOREIGN PATENT DOCUMENTS

JP 58008849 1/1983

(Continued)

OTHER PUBLICATIONS

Japanese Office Action for Application No. 2007-269638 mailed on Jun. 1, 2010.

*Primary Examiner*—Tisha D Lewis
(74) *Attorney, Agent, or Firm*—Carlson, Gaskey & Olds, P.C.

(57) ABSTRACT

A support shaft provides lubrication to a journal bearing during windmilling operation of a gear set. A primary oil pump provides oil from an oil supply during driven operation of the fan, and a secondary oil pump provides oil from an internal sump during windmilling operation of the fan. During driven operation of the fan, oil is pumped with the primary oil pump through a primary oil flow path to an outer surface of the support shaft. During windmilling fan operation, oil is pumped from an internal sump with a secondary oil pump through the secondary oil flow path. The secondary oil flow path has a smaller flow capacity, and the secondary oil pump is a smaller capacity pump.

24 Claims, 4 Drawing Sheets

U.S. PATENT DOCUMENTS

2008/0006018 A1  1/2008  Sheridan et al.

FOREIGN PATENT DOCUMENTS

| | | |
|---|---|---|
| JP | 5-27423 | 4/1993 |
| JP | 9-512079 | 12/1997 |
| JP | 2000-274515 | 10/2000 |
| JP | 2001-208146 | 8/2001 |

\* cited by examiner

US 7,883,438 B2

LUBRICATION OF WINDMILLING JOURNAL BEARINGS

REFERENCE TO RELATED APPLICATION

This application is a continuation of U.S. application Ser. No. 11/582,581 filed on Oct. 18, 2006 now U.S. Pat. No. 7,662,059.

BACKGROUND OF THE INVENTION

This invention relates to an arrangement for supplying oil to journal bearings for use in fan drive systems for turbofan engines.

Turbine engines use epicyclic gear systems to drive fans or propellers during engine operation. Journal bearings are utilized in the gear systems to transfer torque between planet gears and corresponding support shafts. Oil is supplied from an oil system to lubricate each of the journal bearings. An oil pump maintains pressure within the oil system to ensure each of the journal bearings receives an adequate supply of oil.

During operation, the gas turbine can be shut down for various reasons. When the gas turbine is not operating, the oil pump may also shut down. However, due to the force of the wind, the fan will continue to rotate, or windmill, even while the engine is not driving the fan. Without some oil supply, the journal bearings may seize and stop engine rotation.

The required oil supply for a windmilling fan is significantly reduced compared to driven fan operation. Thus, the size of the oil lines used for driven fan operation is larger than the size of the oil lines needed for a windmilling fan. A pressure drop across all bearings would occur if using the same oil lines at significantly reduced flow, resulting in only some of the bearings receiving oil. Also, in the event of system oil loss, a separate system to supply oil to the bearings for windmilling is required.

Accordingly, providing an improved arrangement to lubricate journal bearings during windmilling fan operation is desired.

SUMMARY OF THE INVENTION

An example journal bearing according to this invention provides lubrication to a planet gear during windmilling operation of a gear system.

During engine operation, a fan for a turbine engine is driven by a fan drive gear system including an epicyclic gear set. An oil supply system supplies oil to lubricate the epicyclic gear set. When the engine in not operating, wind passing through the fan can cause the fan to rotate, or windmill, even though the fan is not being driven by the fan drive gear system.

Each planet gear within the epicyclic gear set has a journal bearing located between a planet gear and a support shaft. The journal bearings transfer torque between the planet gears and the support shafts. During driven operation of the fan, oil is pumped by the primary oil pump through a primary oil flow path to an outer surface of the support shaft.

During windmilling fan operation, the planet gears continue to rotate in the same rotational direction at a slower rotational speed. Because of the slower speed, less oil is required to lubricate the journal bearings. Oil is pumped from an internal compartment sump with a secondary oil pump through a secondary oil flow path. The secondary oil flow path has a smaller flow capacity, and the secondary oil pump is a smaller capacity pump.

These and other features of the present invention can be best understood from the following specification and drawings, the following of which is a brief description.

DETAILED DESCRIPTION OF THE PREFERRED EMBODIMENT

Figure 1:
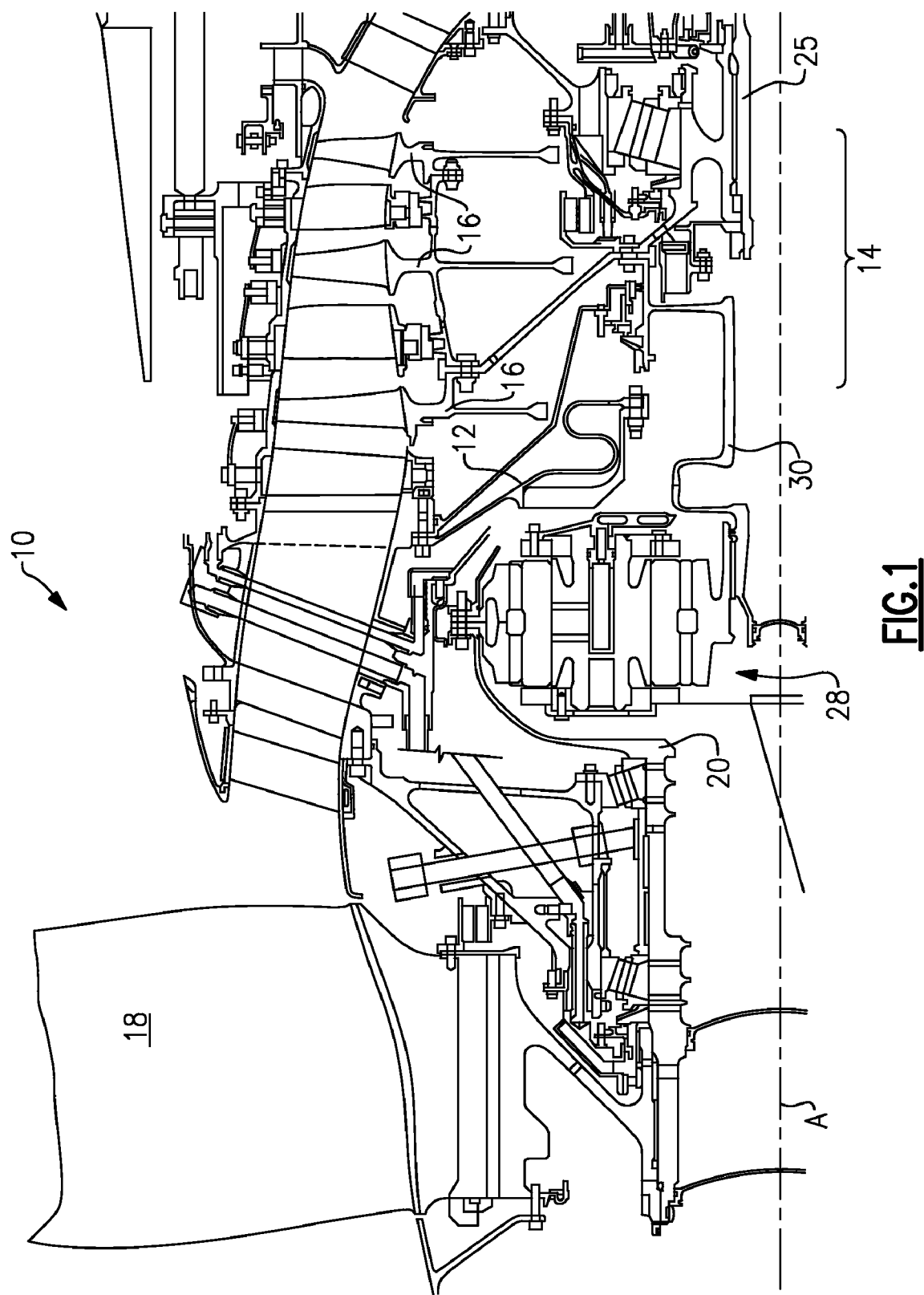
FIG. 1 is a schematic view of a portion of an example turbine engine of the present invention.

FIG. 1 is a schematic view of a portion of a turbine engine 10. The turbine engine 10 includes a fixed housing 12 that is constructed from numerous pieces secured to one another. A compressor section 14 has compressor hubs 16 with blades. A turbine shaft 25 drives the hubs 16 about an axis A. A fan 18 is supported on a fan shaft 20 that is driven by a turbine flexible coupling 30 through a gear set 28.

Figure 2:
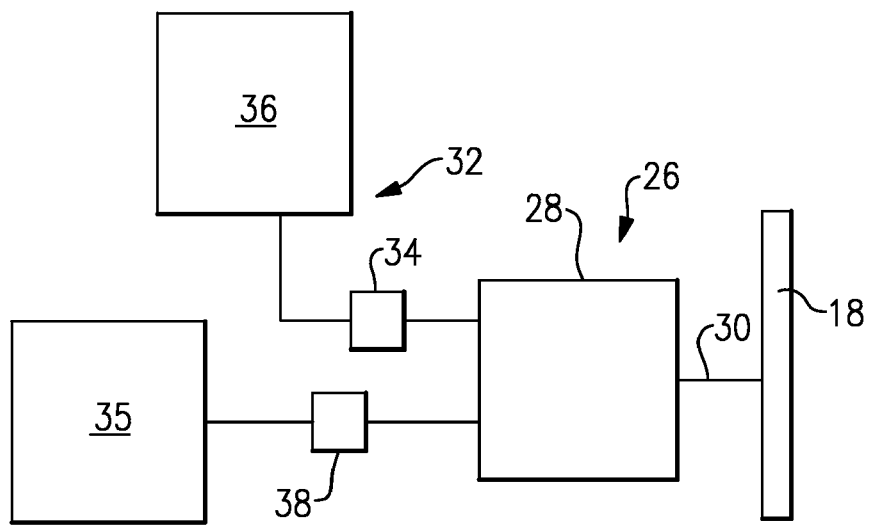
FIG. 2 schematically illustrates a fan drive system for a fan of the example turbine engine.

FIG. 2 schematically illustrates a fan drive system 26 for the fan 18. The gear set 28 is preferably an epicyclic gear set including the turbine flexible coupling 30, which drives the fan 18. An oil supply system 32 supplies oil to the epicyclic gear set 28. The oil supply system 32 includes a primary oil pump 34 which provides oil from an oil supply 36 during driven operation of the fan 18. A secondary oil pump 38 provides oil from an internal sump 35 during windmilling operation of the fan 18.

Figure 3:
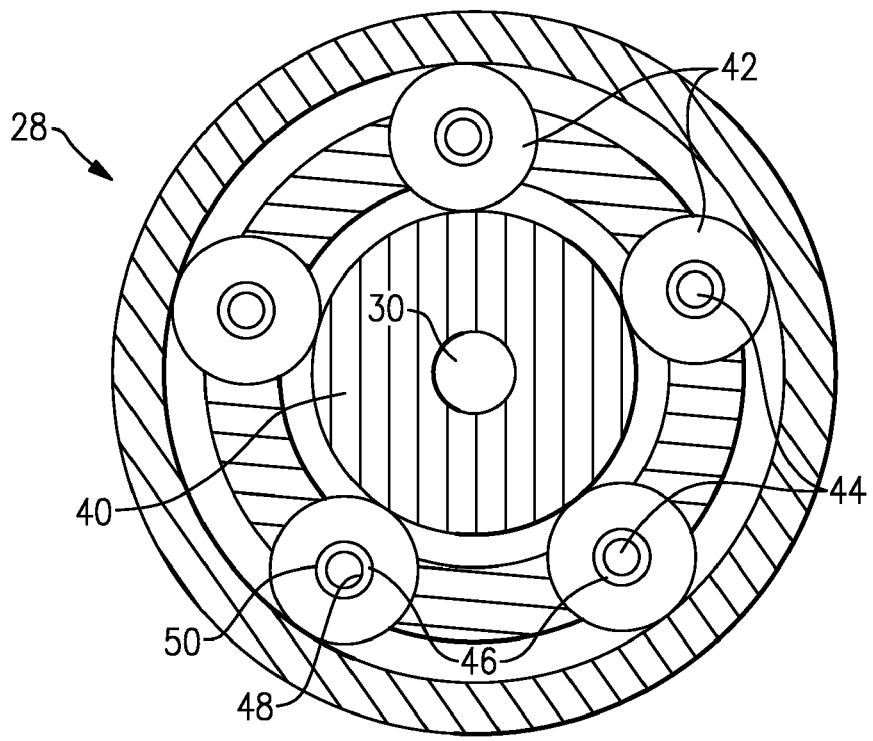
FIG. 3 illustrates an example epicyclic gear set.

Referring to FIG. 3, an example epicyclic gear set 28 is illustrated. A sun gear 40 is mounted to the turbine flexible coupling 30. A plurality of planet gears 42 engage the sun gear 40. In the embodiment shown, there are five planet gears 42. A support shaft 44 supports each planet gear 42. A journal bearing 46 is defined between each of the planet gears 42 and the support shafts 44. The planet gears 42 rotate relative to the support shaft 44. The journal bearings 46 transfer torque between the planet gears 42 and the support shafts 44. A coating is applied to an inner surface 50 of each planet gear 42. The coating contacts the support shaft 44 only during startup and shutdown of the engine 10.

Figure 4A:
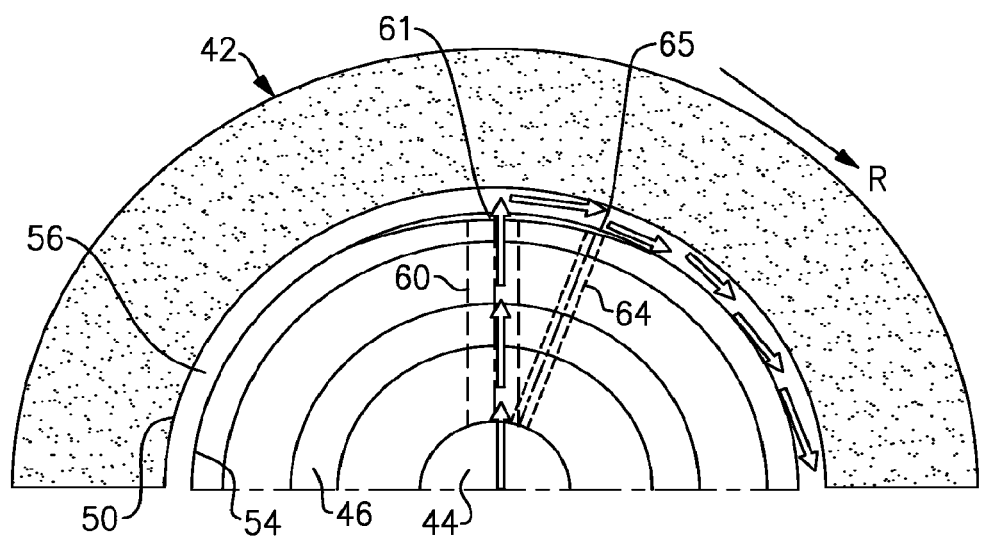
FIG. 4a illustrates a front view of an example journal bearing illustrating oil flow during driven operation of the fan.
Figure 4B:
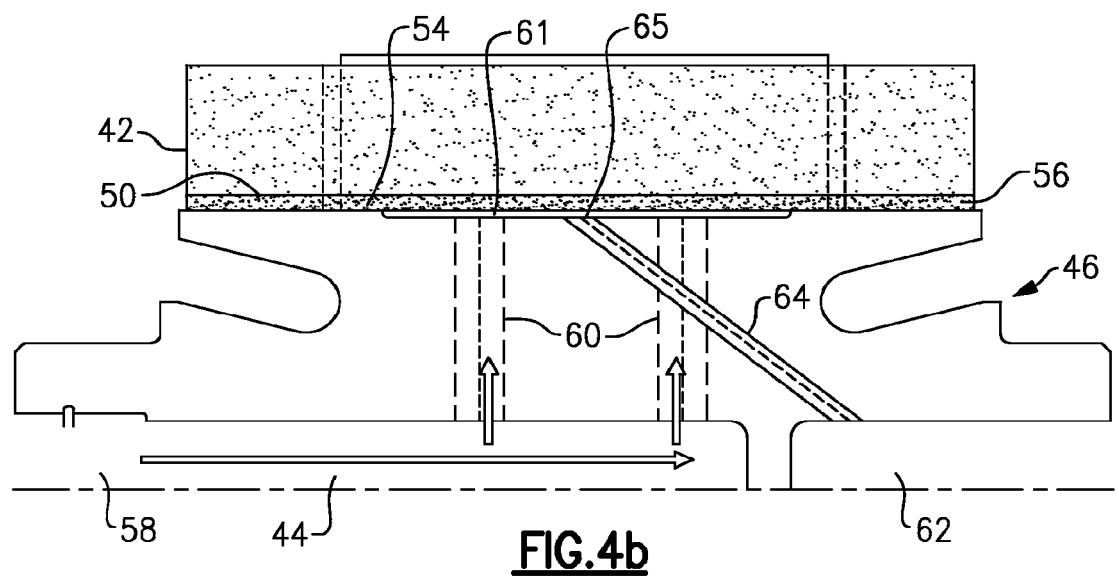
FIG. 4b illustrates a side view of the example journal bearing illustrating oil flow during driven operation of the fan.

FIGS. 4a and 4b illustrate the oil flow through the support shaft 44 during driven operation of the fan 18. The planet gear 42 with the coating rotates around the support shaft 44. The inner surface 50 of the planet gear 42 is adjacent to an outer surface 54 of the support shaft 44. A space 56 between the inner surface 50 and the outer surface 54 allows oil to flow between the support shaft 44 and the planet gear 42. The support shaft 44 remains stationary and the planet gear 42 rotates, as indicated by arrow R.

Oil is pumped from the oil supply 36 with a primary oil pump 34 (shown in FIG. 2). The oil from the primary oil pump 34 enters the support shaft 44 from a first side 58 of the support shaft 44. The oil flows through a primary oil flow path 60 to the outer surface 54 of the support shaft 44. The oil flows through an outlet 61 of the primary oil flow path 60 and flows into the space 56 between the outer surface 54 of the support shaft 44 and the inner surface 50 of the planet gear 42.

Figure 5A:
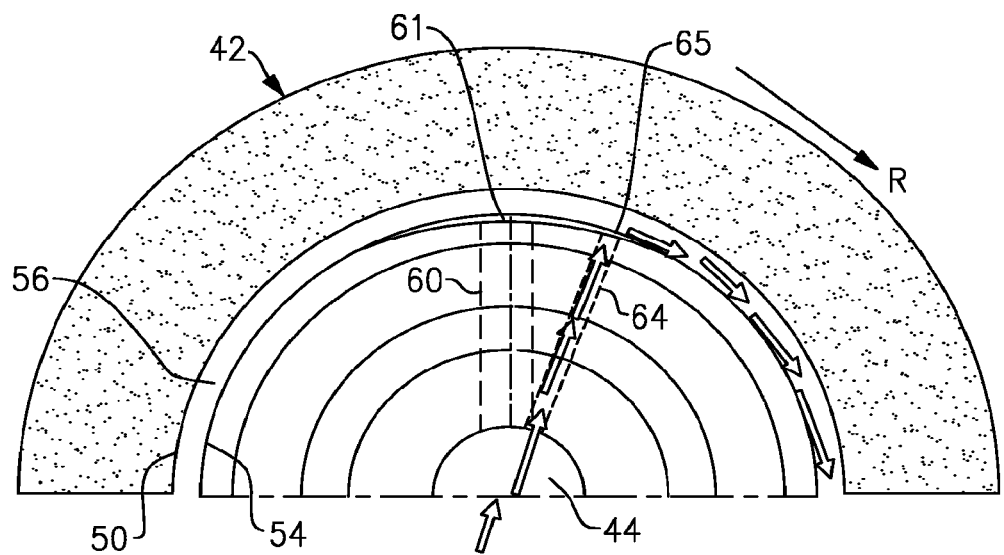
FIG. 5a illustrates a front view of the example journal bearing illustrating oil flow during windmilling operation of the fan.
Figure 5B:
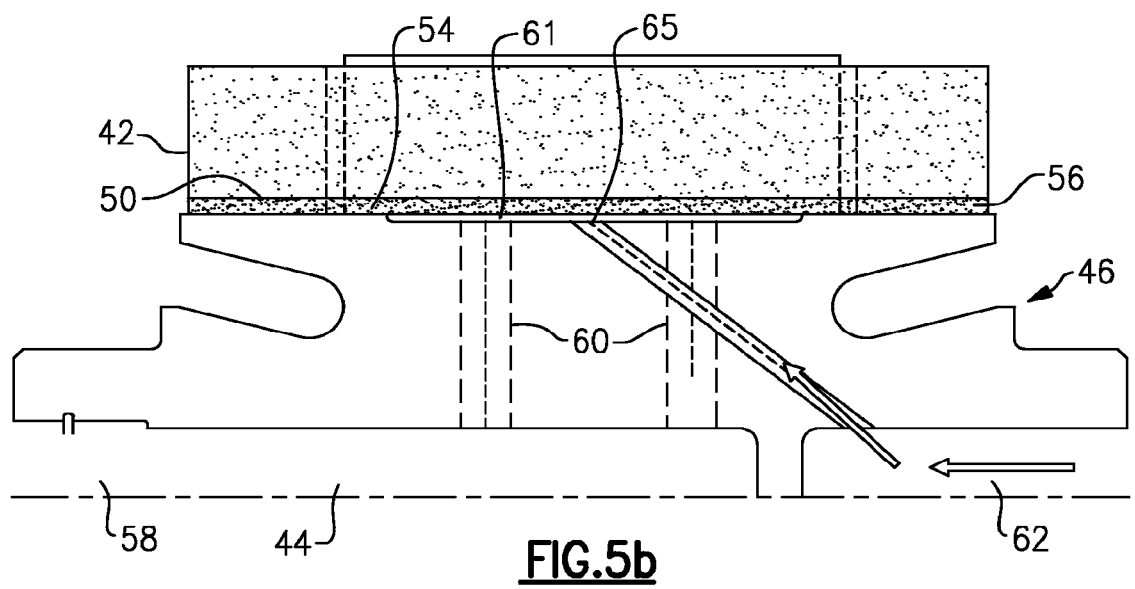
FIG. 5b illustrates a side view of the example journal bearing illustrating oil flow during windmilling operation of the fan.

FIGS. 5*a* and 5*b* illustrate the oil flow through the support shaft 44 during windmilling operation of fan 18. The planet gear 42 continues to rotate in the same rotational direction as it was rotating during driven fan 18 operation. However, the planet gear 42 is moving at a slower rotational speed. Because of the slower speed and load, there is less oil required. Additionally, the primary oil pump 34 may not be operating, which can lower the pressure within the primary oil flow path 60.

The oil is pumped from the internal sump 35 with the secondary oil pump 38 (shown in FIG. 2). The secondary oil pump 38 may be activated to begin pumping when a predetermined minimum pressure is measured within the oil supply system 32. Continuous operation or other arrangements for activating the secondary oil pump 38 may also be utilized. The secondary oil pump 38 pumps oil to the support shaft 44 from a second side 62 of the support shaft 44, and the oil enters a secondary oil flow path 64. The oil flows through an outlet 65 of the secondary oil flow path 64 and flows into the space 56. Less oil is required to lubricate the space 56 between the outer surface 54 of the support shaft 44 and the inner surface 50 of the planet gear 42 because of the slow rotational speed of the planet gear 42 and the lower load. The secondary oil flow path 64 has a smaller flow capacity then the primary oil flow path 60. That is, the secondary oil flow path 64 has a smaller diameter passage. Additionally, the secondary oil pump 38 may be a smaller capacity pump than the primary oil pump 34 because less pressure and volume is required to support the planet gear 42.

The support shaft 44 of the present invention is described for use with turbine engines. However, the support shaft 44 may be used in epicyclic gear sets 28 providing drive for other applications.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An epicyclic gear set comprising:
a sun gear;
a plurality of planet gears arranged around and driven by the sun gear; and
a plurality of support shafts each associated with one of the plurality of planet gears, wherein each of the plurality of support shafts has a primary oil flow path for supplying oil during driven gear operation and a secondary oil flow path for supplying the oil when the sun gear is not driving the plurality of planet gears, wherein the primary oil flow path and the secondary oil flow path are non-parallel and non-perpendicular to each other, wherein the oil within the primary oil flow path is supplied from a first oil source, and the oil within the secondary oil flow path is supplied from a second oil source, wherein the first oil source is different from the second oil source.

2. The epicyclic gear set of claim 1, wherein the primary oil flow path enters each of the plurality of support shafts from a first side and the secondary oil flow path enters each of the plurality of support shafts from a second side opposite to the first side.

3. The epicyclic gear set of claim 1, wherein the primary oil flow path has a larger flow capacity than the secondary oil flow path.

4. The epicyclic gear set of claim 1, wherein a primary oil pump pumps the oil to the primary oil flow path and a secondary oil pump pumps the oil to the secondary oil flow path.

5. The epicyclic gear set of claim 1, wherein each of the plurality of planet gears are supported by one of the plurality of support shafts to define a journal bearing between each of the plurality of support shafts and the plurality of planet gears.

6. The epicyclic gear set of claim 5, wherein the primary oil flow path and the secondary oil flow path supply the oil between each of the plurality of support shafts and the plurality of planet gears.

7. The epicyclic gear set of claim 1, wherein a primary oil pump pumps the oil from the first oil source to the primary oil flow path, a secondary oil pump pumps the oil from the second oil source to the secondary oil flow path, and the primary oil flow path has a larger flow capacity than the secondary oil flow path.

8. The epicyclic gear set of claim 1, wherein the oil is pumped through the secondary oil flow path when a predetermined minimum pressure is measured within an oil supply system.

9. The epicyclic gear set of claim 1, wherein the plurality of planet gears are windmilling when the sun gear is not driving the plurality of planet gears.

10. A turbine engine comprising:
a fan supported on a fan shaft;
an epicyclic gear system for driving the fan shaft, the epicyclic gear system including a sun gear and a plurality of planet gears arranged around and driven by the sun gear;
a plurality of support shafts each associated with one of the plurality of planet gears, wherein each of the plurality of support shafts includes a primary oil flow path for supplying oil during driven gear operation and a secondary oil flow path for supplying the oil when the sun gear is not driving the plurality of planet gears; and
an oil supply system to supply the oil to the primary oil flow path and the secondary oil flow path, wherein the primary oil flow path and the secondary oil flow path are non-parallel and non-perpendicular to each other path, wherein the oil supply system comprises a primary oil source to supply the oil to the primary oil flow path and a secondary oil source to provide the oil to the secondary oil flow path, wherein the primary oil source is different from the secondary oil source.

11. The turbine engine of claim 10, wherein the primary oil flow path enters each of the plurality of support shafts from a first side and the secondary oil flow path enters each of the plurality of support shafts from a second side opposite to the first side.

12. The turbine engine of claim 10, wherein the primary oil flow path has a larger flow capacity then the secondary oil flow path.

13. The turbine engine of claim 10, wherein a primary oil pump pumps the oil to the primary oil flow path and a secondary oil pump pumps the oil to the secondary oil flow path.

14. The turbine engine of claim 10, wherein each of the plurality of planet gears are supported by one of the plurality of supports shafts, and a journal bearing is defined between each of the plurality of support shafts and the plurality of planet gears.

15. The turbine engine of claim 12, wherein the primary oil flow path and the secondary oil flow path supply the oil between each of the plurality of support shafts and the plurality of planet gears.

16. The turbine engine of claim 10, wherein a primary oil pump pumps the oil from the primary oil source to the primary oil flow path, a secondary oil pump pumps the oil from the secondary oil source to the secondary oil flow path, and the primary oil flow path has a larger flow capacity than the secondary oil flow path.

17. The turbine engine of claim 10, wherein the oil is pumped through the secondary oil flow path when a predetermined minimum pressure is measured within the oil supply system.

18. The turbine engine of claim 10, wherein the plurality of planet gears are windmilling when the sun gear is not driving the plurality of planet gears.

19. The epicyclic gear set of claim 1,
wherein, during driven gear operation, the oil flows through the primary oil flow path and does not flow through the secondary oil flow path, and
wherein, when the sun gear is not driving the plurality of planet gears, the oil flows through the secondary oil flow path and does not flow through the primary oil flow path.

20. The epicyclic gear set of claim 1, wherein the primary oil flow path supplies oil only during driven gear operation, and the secondary oil flow path supplies oil only when the sun gear is not driving the plurality of planet gears.

21. The epicyclic gear set of claim 1, wherein an outlet of the primary oil flow path and an outlet of the second oil flow path leads to a common space.

22. The turbine engine of claim 10,
wherein, during driven gear operation, the oil flows through the primary oil flow path and does not flow through the secondary oil flow path, and
wherein, when the sun gear is not driving the plurality of planet gears, the oil flows through the secondary oil flow path and does not flow through the primary oil flow path.

23. The turbine engine of claim 10, wherein the primary oil flow path supplies oil only during driven gear operation, and the secondary oil flow path supplies oil only when the sun gear is not driving the plurality of planet gears.

24. The turbine engine of claim 10, wherein an outlet of the primary oil flow path and an outlet of the second oil flow path leads to a common space.

\* \* \* \* \*